United States Patent [19]
Fortune et al.

[11] Patent Number: 6,101,436
[45] Date of Patent: Aug. 8, 2000

[54] VEHICLE OCCUPANT WEIGHT ESTIMATION APPARATUS HAVING FLUID-FILLED MULTI-CELL SEAT BLADDER

[75] Inventors: Duane Donald Fortune, Lebanon; Robert Joseph Myers, Russiaville; Morgan Daniel Murphy; Pamela Ann Roe, both of Kokomo, all of Ind.

[73] Assignee: Delco Electronics Corp., Kokomo, Ind.

[*] Notice: This patent is subject to a terminal disclaimer.

[21] Appl. No.: 09/028,869

[22] Filed: Feb. 18, 1998

Related U.S. Application Data

[63] Continuation-in-part of application No. 08/923,020, Sep. 3, 1997, Pat. No. 5,987,370.

[51] Int. Cl.[7] ........................................... G06F 17/00
[52] U.S. Cl. .................. 701/45; 701/36; 280/734; 280/735; 180/271
[58] Field of Search .................. 701/45, 36, 49; 280/735, 734, 730.1; 180/273, 282, 268, 271; 177/209; 297/DIG. 3, 452.41, 195.12, 284.6; 340/436, 666, 667, 665

[56] References Cited

U.S. PATENT DOCUMENTS

| | | | |
|---|---|---|---|
| 5,474,327 | 12/1995 | Schousek | 280/735 |
| 5,573,269 | 11/1996 | Gentry et al. | 280/735 |
| 5,658,050 | 8/1997 | Lorbiecki | 297/452.41 |
| 5,739,757 | 4/1998 | Gioutsos | 340/667 |
| 5,820,162 | 10/1998 | Fink | 280/742 |
| 5,877,677 | 3/1999 | Fleming et al. | 340/436 |
| 5,957,491 | 9/1999 | Cech et al. | 280/735 |

*Primary Examiner*—Jacques H. Louis-Jacques
*Attorney, Agent, or Firm*—Jimmy L. Funke

[57] ABSTRACT

An improved weight estimation apparatus in which a closed, multiple cell elastomeric bladder filled with fluid is installed in the foam cushion of a vehicle seat bottom, with at least one pressure sensor installed in a closed exit port of the bladder. The multiple cells of the bladder are formed by a pattern of spot welds between the top and bottom layers of the bladder, creating an array of generally circular or hexagonal cells between which the fluid can freely flow. The array of cells maximizes the pressure response for improved sensitivity, and minimizes the amount of fluid required to detect occupant weight, thereby minimizing the weight of the fluid-filled bladder. The pattern of spot welds in the vicinity of the pressure sensing location may be altered to reduce sensitivity to forces applied in proximity to the exit port. In a first embodiment, a more dense pattern of spot welds is provided in the vicinity of the exit port, while in a second embodiment, continuous welding is used to form a pattern of closed fluid-free pockets in the vicinity of the exit port.

4 Claims, 8 Drawing Sheets

VEHICLE OCCUPANT WEIGHT ESTIMATION APPARATUS HAVING FLUID-FILLED MULTI-CELL SEAT BLADDER

This application is a continuation-in-part of U.S. Ser. No. 08/923,020, entitled Vehicle Occupant Weight Estimation Apparatus Having Fluid-Filled Seat Bladder, filed Sep. 3, 1997, now U.S. Pat. No. 5,987,370, and assigned to the assignee of the present invention.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criteria to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. In practice, however, such systems tend to be relatively costly to implement, and require a significant amount of signal processing for proper calibration and weight estimation.

Another technique, described in U.S. Ser. No. 08/801,218, entitled Adaptive Seating System, filed on Feb. 19, 1997, now pending, and assigned to General Motors Corporation, involves measuring and adjusting the pressure in several inflated bladders variously located in a given passenger seat. When a sharp increase in the measured pressures is detected, the passenger weight is estimated based on a comparison of current pressures with previously measured "vacant seat" pressures.

SUMMARY OF THE PRESENT INVENTION

The present invention is directed to an improved weight estimation apparatus in which a closed, multiple cell elastomeric bladder filled with fluid is installed in or adjacent to the foam cushion of a vehicle seat bottom, with at least one pressure sensor installed in a closed exit port of the bladder. The multiple cells of the bladder are formed by a pattern of spot welds between the top and bottom layers of the bladder, creating an array of generally circular or hexagonal cells between which the fluid can freely flow. The array of cells maximizes the pressure response for improved sensitivity, and minimizes the amount of fluid required to detect occupant weight, thereby minimizing the weight of the fluid-filled bladder. A temperature sensor disposed in proximity to the bladder provides a temperature signal, and a controller estimates the weight of the occupant based on the temperature and pressure signals. Preferably, the pressure sensor is configured to sense the gage pressure—that is, the differential pressure between the fluid and atmospheric pressure—at the center of gravity of the fluid in order to provide a stable output independent of changing atmospheric pressure and changing orientation of the bladder due to vehicle pitch and roll.

In certain mechanizations, the pattern of spot welds in the vicinity of the pressure sensing location may be altered to reduce sensitivity to forces applied in proximity to the exit port. In a first approach, a more dense pattern of spot welds is provided in the vicinity of the exit port, while in a second approach, continuous welding is used to form a pattern of closed fluid-free pockets in the vicinity of the exit port.

BRIEF DESCRIPTION OF THE DRAWINGS

FIGS. 3A–3D depict four alternate embodiments of a fluid filled bladder according to this invention.

DETAILED DESCRIPTION OF THE DRAWINGS

Figure 1:
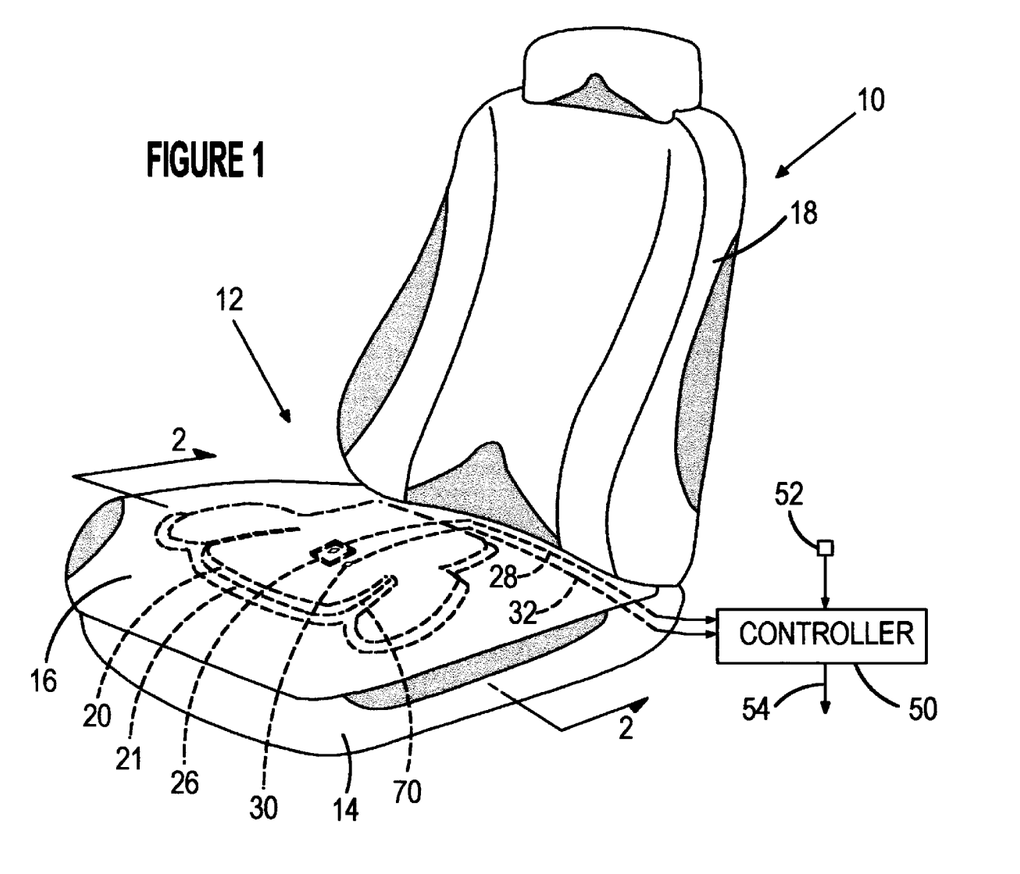
FIG. 1 is a system diagram illustrating a passenger seat of a vehicle equipped with a fluid-filled bladder and a controller for estimating the weight of a seat occupant in accordance with this invention.

Referring to the drawings, and particularly to FIG. 1, the reference numeral 10 generally designates a vehicle occupant weight estimation apparatus according to this invention. The vehicle seat 12 is supported on a frame 14, and includes foam cushions 16 and 18 on the seat bottom and back. A vacuum formed polymeric bladder 20 having a continuous weld 21 about its periphery is disposed in or adjacent to the foam cushion 16 substantially parallel with the central seating surface, and contains a fluid such as silicone which is non-corrosive, and not subject to freezing at extreme ambient temperatures.

Figure 2:
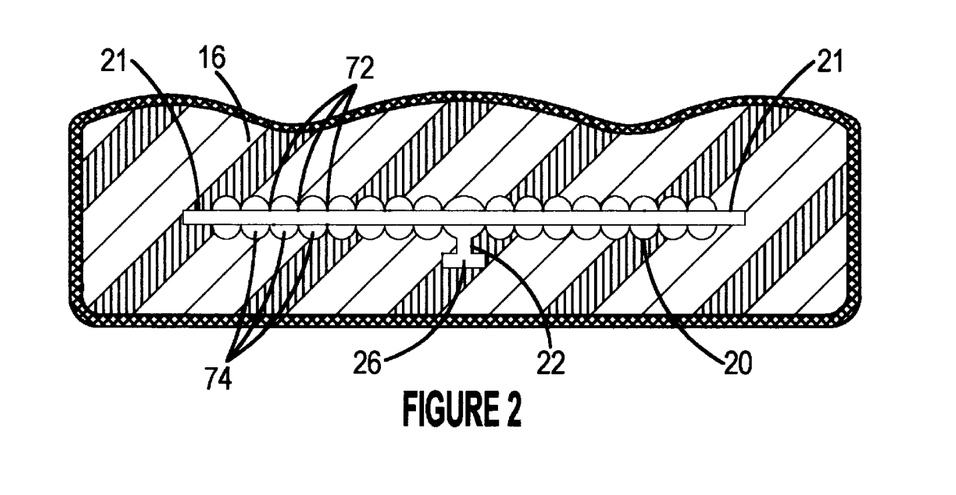
FIG. 2 is a cross-section view of a foam seat cushion and fluid-filled bladder according to this invention.
Figure 4A:
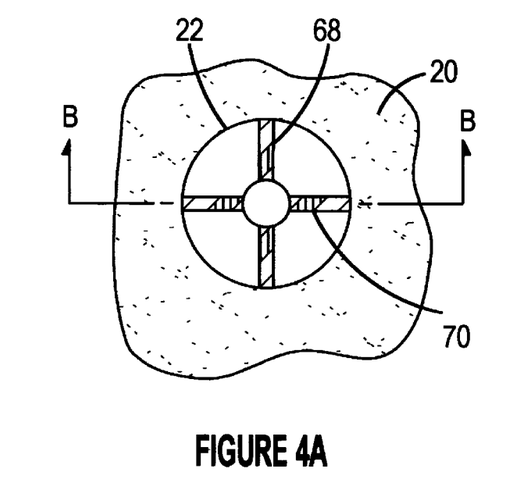
FIGS. 4A–4B depict a pressure sensor configuration according to a preferred embodiment of this invention.
Figure 4B:
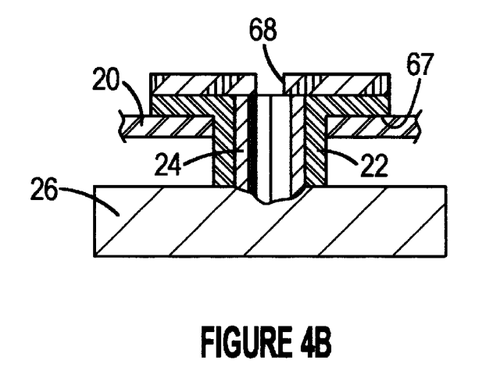

Referring to FIGS. 1 and 2, the bladder 20 is depicted as being disposed within the foam cushion 16; however, it should be understood that in certain installations, the bladder 20 may be disposed atop or even underneath the foam cushion 16. As shown in FIGS. 4A–4B, the bladder 20 includes a fill tube or exit port 22 which is sealed about the inlet port 24 of a pressure sensor 26. The sensor 26, in turn, provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26.

The electrical pressure and temperature signals on lines 28 and 32 are provided as inputs to a controller 50, which determines if the seat 12 is occupied and estimates the weight of the occupant based on the pressure and temperature signals, possibly in combination with other inputs, such as an atmospheric pressure signal provided pressure sensor 52. An electrical output signal indicative of the weight estimation is provided on line 54, and may be used, for example, as a factor in determining whether and how forcefully to deploy air bags or other pyrotechnically deployed restraints in a crash event. The controller 50 may be mechanized with a suitably programmed microprocessor, as described below in reference to FIGS. 5–7. The fluid in bladder 20 has a nominal or unloaded pressure which provides a baseline measurement, and the pressure increases monotonically with occupant weight applied to the cushion 16. The temperature measurement is used to compensate the weight measurement for corresponding changes in foam and bladder stiffness, to provide a weight measurement that is insensitive to temperature variations.

Preferably, the pressure sensor 26 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the sensor 26 includes a second inlet (not shown) open to atmospheric pressure. Alternately, the sensor 26 may provide an absolute pressure measurement of the bladder fluid, and the controller 50 may compensate the measurement for atmospheric pressure variations by reducing the fluid pressure measurement by the atmospheric pressure measurement provided by sensor 52.

In mechanizing the present invention, it was discovered that, depending on the placement of the exit port 22, the pressure sensed by sensor 26 experiences significant variability with changes in the orientation of the bladder. Specifically, the sensed pressure changes whenever the center of gravity of the bladder fluid changes relative to the location of the exit port 22. This can occur when there is fore-aft pitch due to uphill or downhill operation of the vehicle, or when there is roll due to turning.

One solution to the above-described problem is to use multiple pressure sensors located in the front, rear and side of the bladder 20. In this case, the pressures sensed by the front and rear pressure sensors are averaged to compensate for pitch, and the pressure sensed by the side sensor is used to compensate for roll. The exit ports in the case of multiple sensors should be equal in diameter and length to avoid imbalance in the various pressure drops.

A preferred approach to compensating for pitch and roll is to determine the location of the center of gravity of the fluid in a given application, and to sense the fluid pressure at the center of gravity. This can be done, as shown in FIGS. 1, 2 and 4A–4B, by means of a fill tube or exit port 22 coupled to the sensor 26, with the bladder 20 sealed around the tube 22 at a shoulder 67 thereof. The inlet 24, depicted in detail in FIGS. 4A–4B, is configured with side ports 68, 70 to ensure open fluid communication between the bladder fluid and the sensor 26 at all times. Preferably, the length of tube 22 is minimized by placing the pressure sensor inlet 24 in close proximity to bladder 20, as shown in FIG. 4B. However, the sensor 26 may be located remote from the bladder if required by simply extending the tube 22; in this case, the tube 22 should have a relatively small diameter to minimize the quantity of fluid subject to the pitch and roll effects.

Figure 3A:
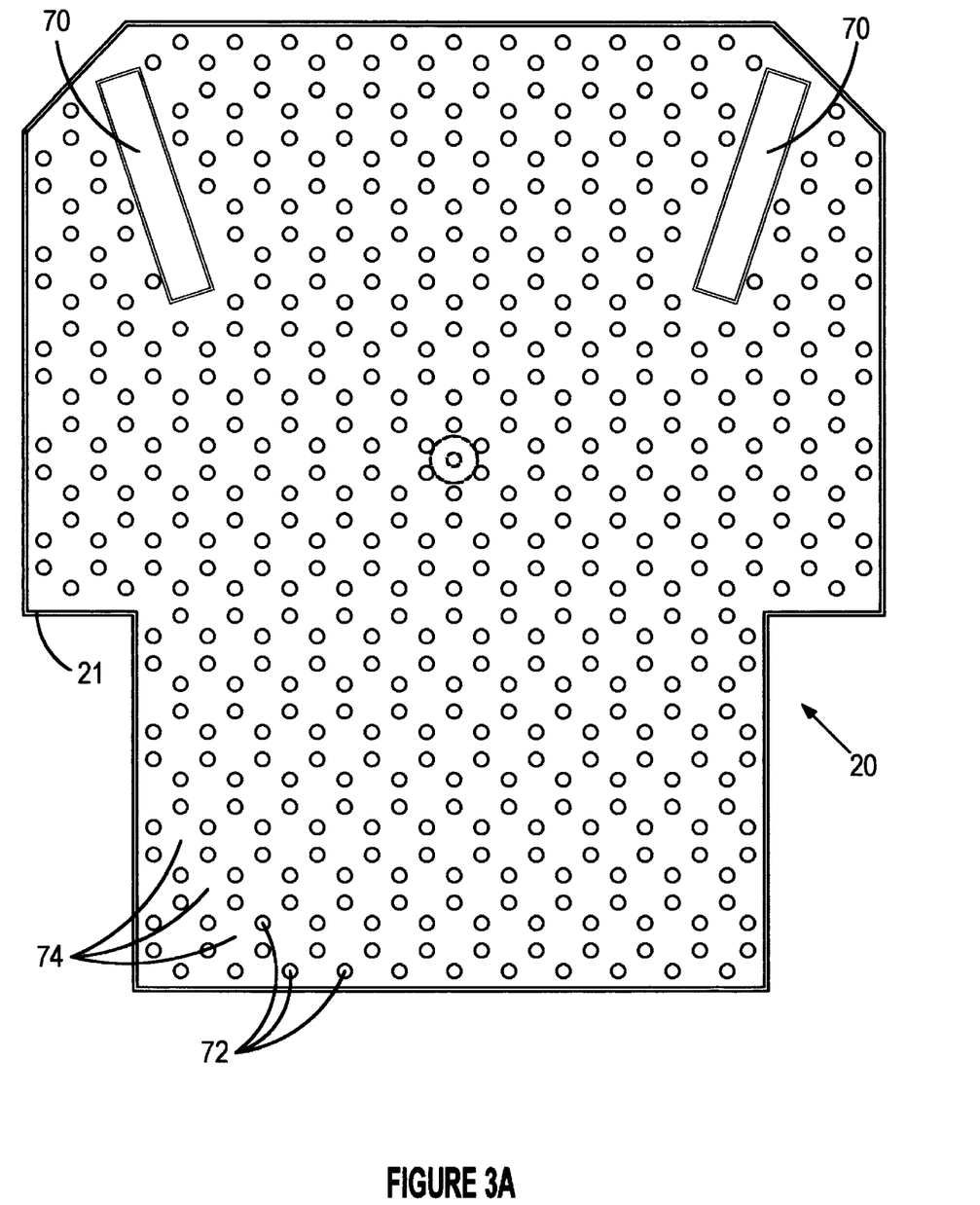
FIG. 3A depicts a bladder with a regular pattern of spot welds.

As seen in FIG. 1, the bladder 20 generally conforms to the shape of the seat bottom 16. The wing crimp areas 70 will vary from seat to seat, and allow the bladder 20 to conform to the shape of the seat cushion. According to this invention, the seat bladder 20 is characterized by a pattern of spot welds 72 between its upper and lower surfaces. The spot welds 72 have the effect of dividing the bladder 20 into a contiguous array of cells 74. Since the welds are not continuous, fluid can freely flow between adjacent cells. The array of cells 74 minimizes the amount of fluid required to detect occupant weight, thereby minimizing the weight of the fluid-filled bladder 20, and prevents the fluid from pooling in an unloaded area of the seat cushion 16. As shown in FIG. 3A, the spot welds 72 preferably extend over the entire surface of the bladder 20, and the exit tube 22 is positioned in the center of one of the cells 74 substantially at the center of gravity of the fluid. Preferably, the spot welds 72 are patterned so that the cells 74 assume a generally circular or domed shape, as best seen in the cross-section of FIG. 2. The domed shape of the cells 74 essentially eliminates vertical wall surfaces within the bladder 20, thereby maximizing the measured pressure response to the weight of an occupant.

The sizes of the individual spot welds 72 and cells 74 are preferably chosen to minimize the weight of the fluid filled bladder 20 while maximizing the sensitivity and accuracy of the weight measurement. In a mechanization of the present invention with a bladder substantially as shown in FIG. 3A, the spot welds had a diameter of approximately 6.4 mm, and were arranged in a circular pattern with a diameter of approximately 30 mm.

Figure 3B:
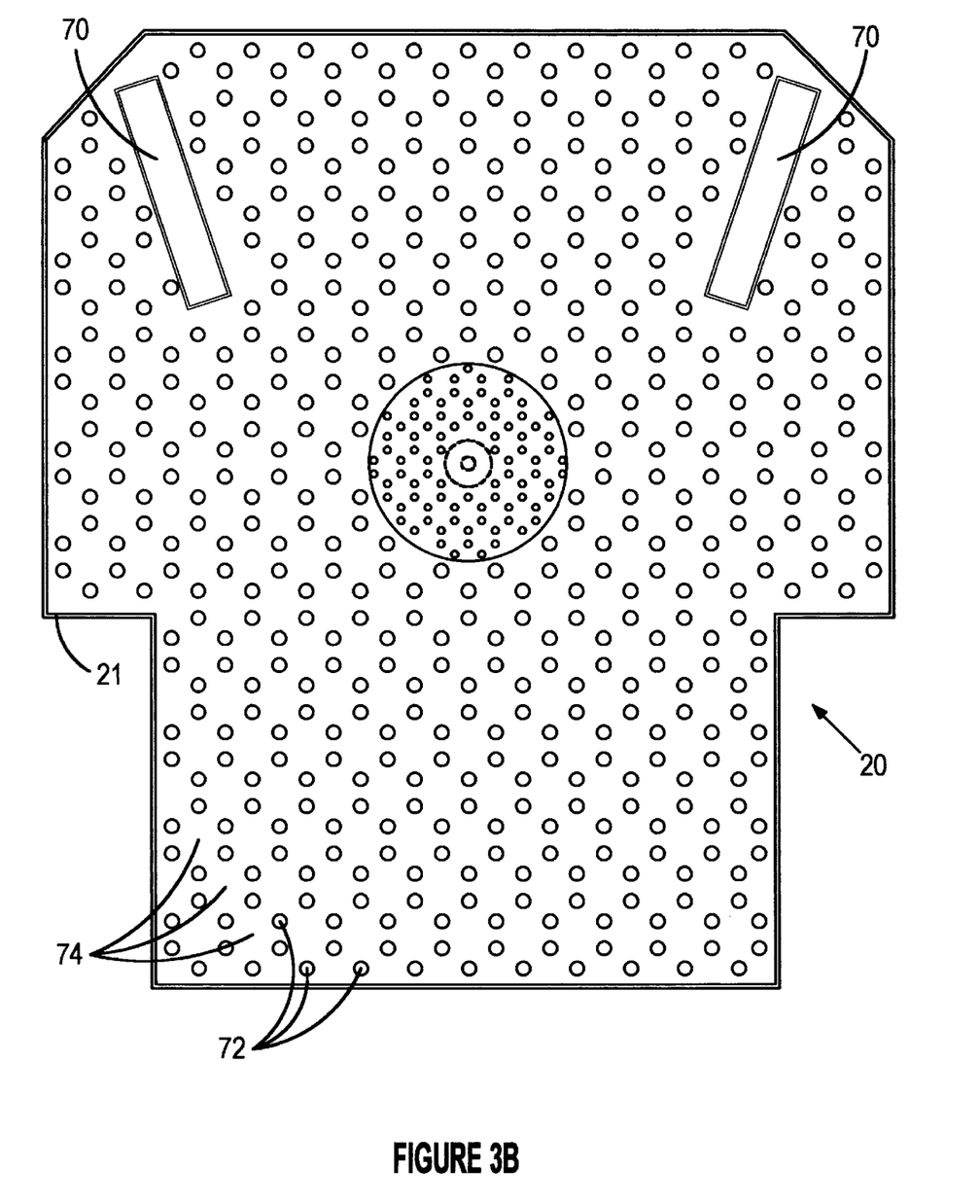
FIG. 3B depicts a bladder like the bladder of FIG. 3A, but with a higher density spot welds in the central pressure sensing area.

In certain applications, it was found that localized occupant weight in the vicinity of the exit port 22 resulted in a undesired fluctuation in the measured pressure. According to this invention, this phenomenon can be eliminated in such applications by altering the cell pattern in the vicinity of the exit port 22 in a manner to reduce the sensitivity to weight applied in that area of the seat cushion 16. FIG. 3B illustrates a first approach in which the density of the pattern of spot welds 72 in the vicinity of the exit port 22 is increased. The increased density of spot welds in the vicinity of exit port 22 reduces the volume of fluid in that portion of the bladder 20, which in turn, decreases the sensitivity to occupant weight applied to that area of seat 12. The approach of FIG. 3B was mechanized with central spot welds approximately 3.2 mm, arranged in a circular pattern with a diameter of approximately 16 mm.

Figure 3C:
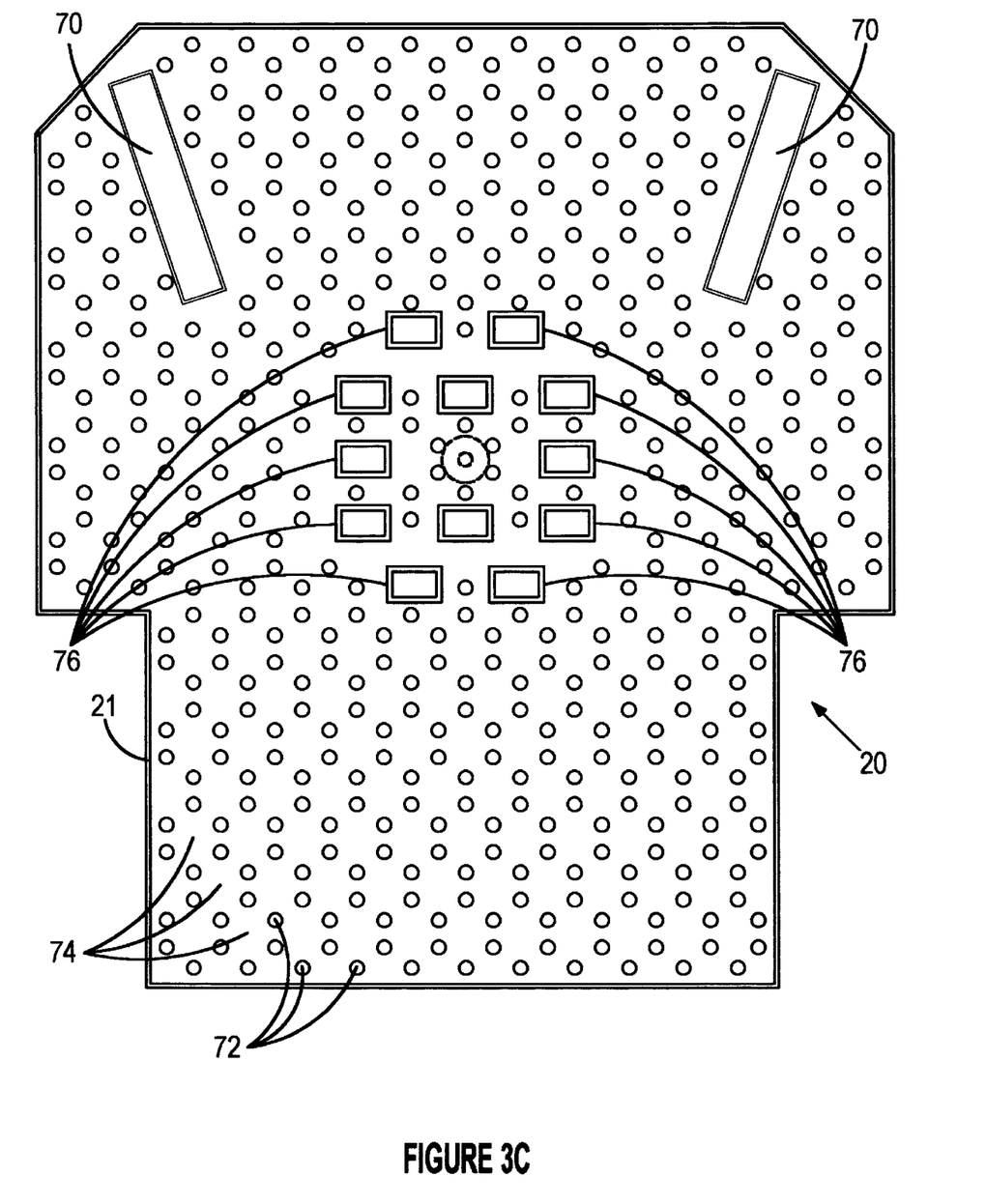
FIGS. 3C–3D depict bladders like the bladder of FIG. 3A, but with closed fluid free areas in the central pressure sensing area.
Figure 3D:
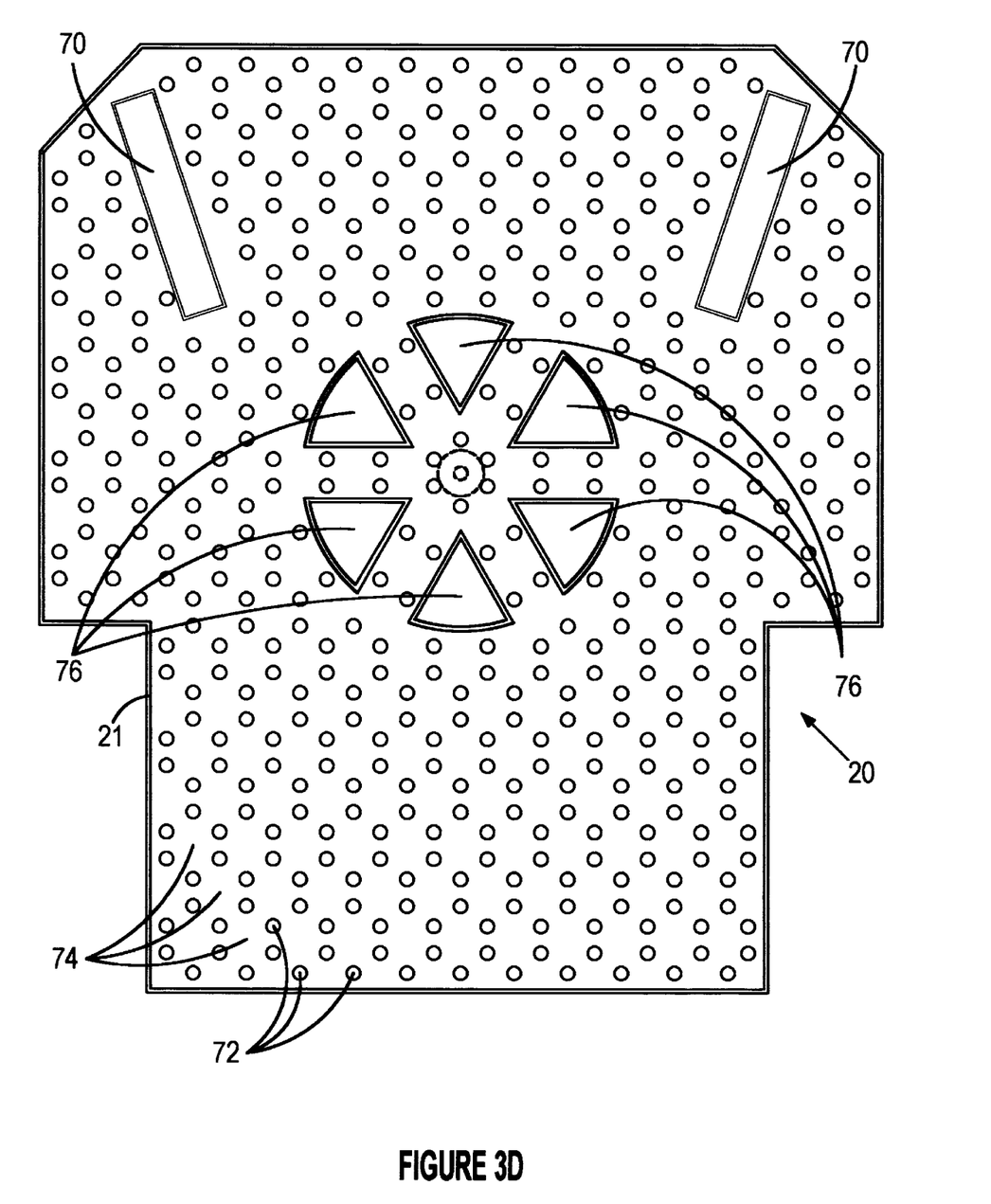

FIGS. 3C and 3D illustrate a second approach in which a number of closed cells 76 are formed in the vicinity of the exit port 22. The closed cells 76 may be easily formed by a continuous weld seam during manufacture of the bladder 20. The cells 76 may contain some air, but due to their closed geometry, do not significantly contribute to increased fluid pressure when subjected to occupant weight. In FIG. 3C, the closed cells 76 are generally rectangular in shape, while in FIG. 3D, the closed cells 76 are generally triangular in shape. Other shapes may be utilized, of course, but the area of reduced sensitivity is preferably symmetrical, at least in respect to the fore-aft centerline of the seat cushion 16.

Figure 5:
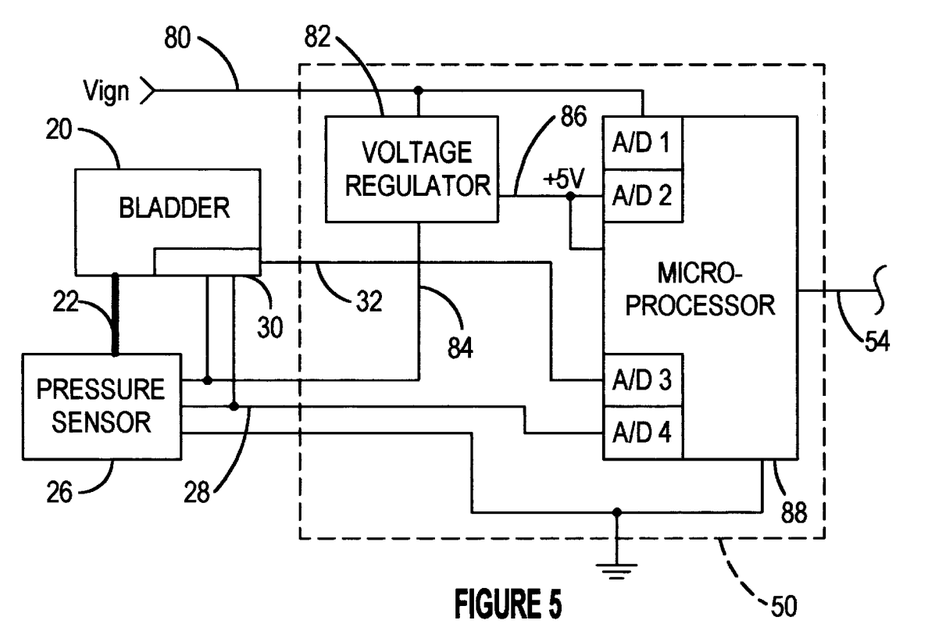
FIG. 5 is a block diagram of the controller of FIG. 1, in the context of an air bag deployment system.

FIG. 5 depicts the occupant weight estimation apparatus of the present invention in the context of an air bag deployment system in which the controller 50 provides an output signal on line 54 indicating whether deployment should be inhibited or allowed based on sensed occupant weight. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1-A/D 4 which receive the ignition voltage Vign, the system voltage of voltage regulator 82, the temperature sensor output voltage on line 32, and the pressure sensor output voltage on line 28.

Based on the above-described inputs, the microprocessor determines the occupant weight, and based on predetermined criterion, whether air bag deployment should be inhibited or allowed. In the illustrated control strategy, air bag deployment is to be inhibited for occupants below a predetermined weight, referred to herein as the threshold weight.

Figure 6:
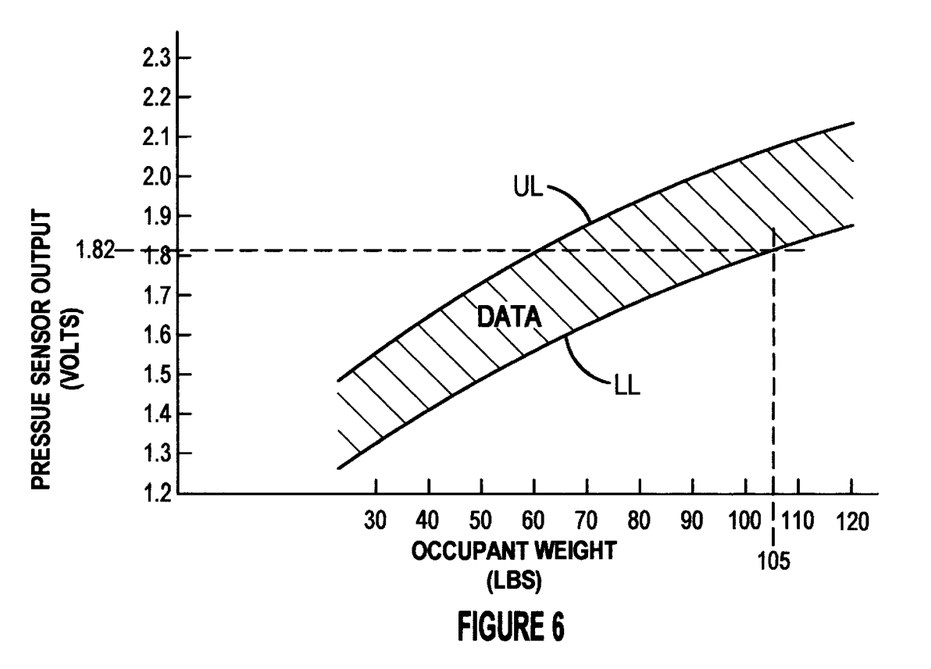
FIG. 6 is a graph depicting pressure sensor output voltage as a function of occupant weight, as used in the system of FIG. 5.

In general, once the occupant weight estimation system 10 is installed in a vehicle, the relationship between occupant weight and sensed pressure (compensated for system voltage variations) is empirically determined at a variety of temperatures. In a system as suggested in FIG. 1, the data can be used to construct either a mathematical model or a multi-dimensional look-up table of occupant weight as a function of temperature and pressure sensor output voltage, with the model or table programmed into the microprocessor and used to determine and output the occupant weight on line 54. In the system of FIG. 5, however, the output merely indicates whether the occupant is above or below the threshold weight, within the system tolerance constraints. In this case, the empirically determined data may be plotted as shown in FIG. 6, and used to develop a pressure sensor threshold voltage for determining whether deployment should be inhibited or allowed. For the data represented in FIG. 6, for example, the lines designated as upper limit UL and lower limit LL bound the pressure sensor output voltage variability for any given occupant weight. Given a threshold weight, such as 105 lbs for example, the lower limit LL defines a threshold voltage which is the minimum voltage, approximately 1.82 volts, one would expect to see for an occupant weighing 105 lbs.

Figure 7:
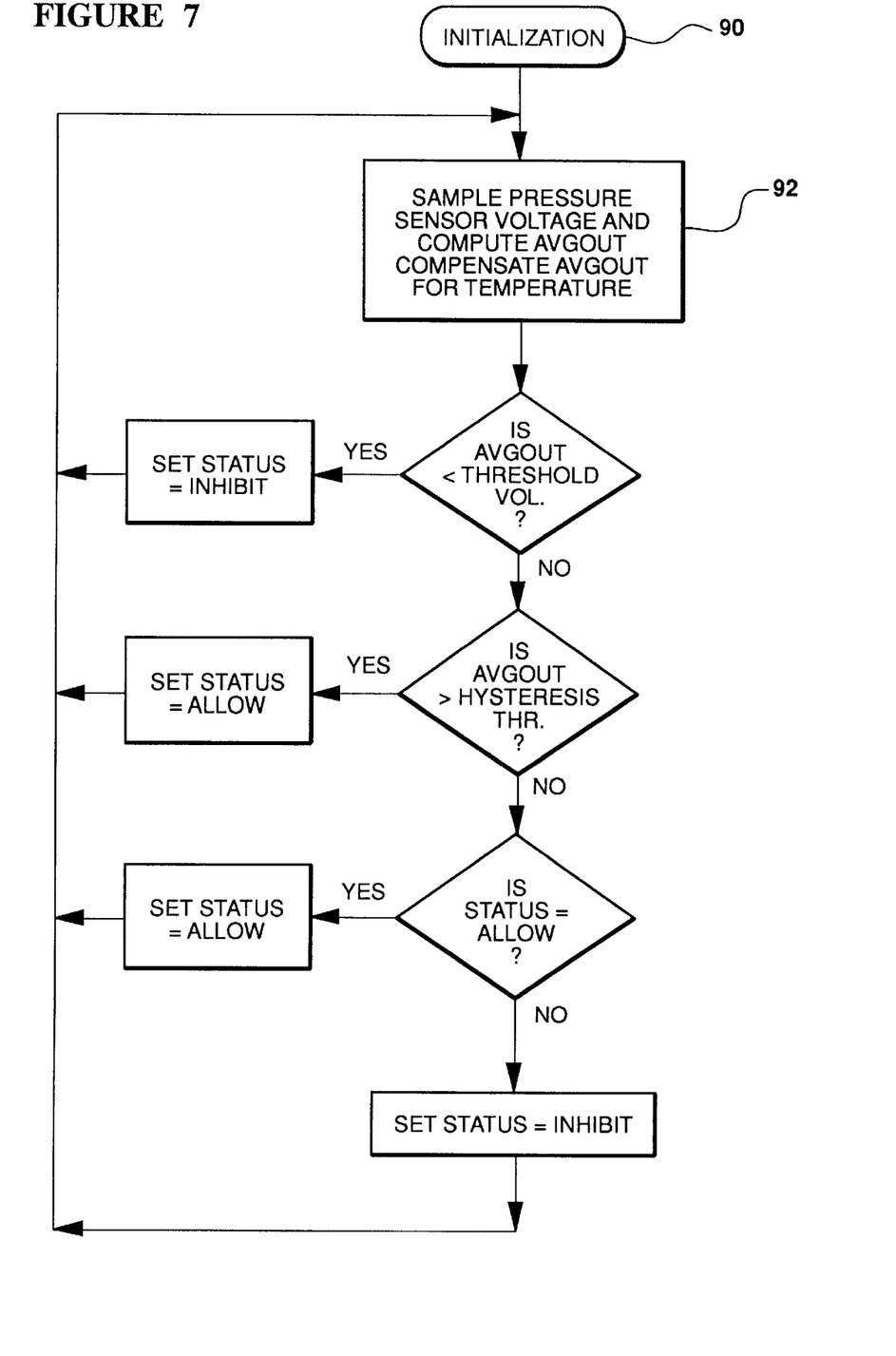
FIG. 7 is a flow chart representative of computer program instructions executed by the controller of FIG. 5.

A simple control algorithm based on the above described threshold voltage is depicted in the flow diagram of FIG. 7, where the block 90 designates a series of program instructions executed at the initiation of vehicle operation for initializing the various registers and variable values. In this case, the system output variable, STATUS, is initially set to a state which inhibits deployment. Thereafter, the block 92 is executed to repeatedly sample the pressure sensor output voltage for a predefined interval to obtain an average output voltage AVGOUT, and to compensate AVGOUT for the temperature sensed by temperature sensor 30. If the temperature compensated value of AVGOUT is less than the threshold voltage of 1.82 volts, as determined at block 94, the block 96 is executed to set STATUS to a state which inhibits deployment. If the temperature compensated value of AVGOUT is greater than a hysteresis threshold voltage corresponding to, say 107 lbs, as determined at block 98, the block 100 is executed to set STATUS to a state which allows deployment. If AVGOUT is between the two threshold voltages, the state of STATUS is maintained unchanged, as indicated by the blocks 102–106.

It should be understood that the simple control described above is exemplary in nature, and could be modified to include adaptive updating of the thresholds, or to provide a more precise output as described above in reference to FIG. 1, for example. Likewise, it should be understood in general that while the occupant weight estimation apparatus of this invention has been described in reference to the illustrated embodiments, various modifications will occur to persons skilled in the art. For example, different distributions or sizes of spot welds and weld patterns may be used, depending on the specific application. Accordingly, it will be understood that systems incorporating such modifications may fall within the scope of this invention, which is defined by the appended claims.

The embodiments of the invention in which an exclusive property or privilege is claimed are defined as follows:

1. Apparatus for estimating the weight of an occupant of a seat in a motor vehicle, the seat having a foam cushion bottom, the apparatus comprising:

a fluid-filled bladder disposed in the foam cushion bottom, the bladder comprising top and bottom sheets of elastomeric material with a continuous seam about their periphery to form a closed volume, a plurality of spot welds between said top and bottom sheets, said spot welds being distributed over said bladder, thereby dividing said bladder into a contiguous array of generally circular cells with free flow of said fluid between adjacent cells, the bladder being substantially filled with fluid, and an exit port disposed in said bottom sheet, substantially centered in a central one of said cells positioned at a center of gravity of said fluid;

a pressure sensor coupled to said exit port for sealing said exit port and for sensing the pressure of said fluid; and control means for estimating the weight of the occupant based on the sensed fluid pressure.

2. The apparatus of claim 1, wherein there is an increased density of said spot welds in a central region of said bladder surrounding said exit port thereby forming a second plurality of contiguous cells in said central region which are smaller than the contiguous cells disposed outside of said central region.

3. The apparatus of claim 1, including additional welds in a central region of said bladder surrounding said exit port, said additional welds forming a plurality of closed, fluid-free cells in said central region, spaced generally symmetrically with respect to said exit port, and being generally triangular in shape.

4. The apparatus of claim 1, wherein said control means provides an input to an air bag deployment system, said input indicating whether deployment should be inhibited or allowed based on the estimated weight of the occupant.

* * * * *